Apr. 17, 1923.
J. A. STEINMETZ
1,452,284
TIRE INFLATING ATTACHMENT FOR DISK WHEELS
Filed April 11, 1921
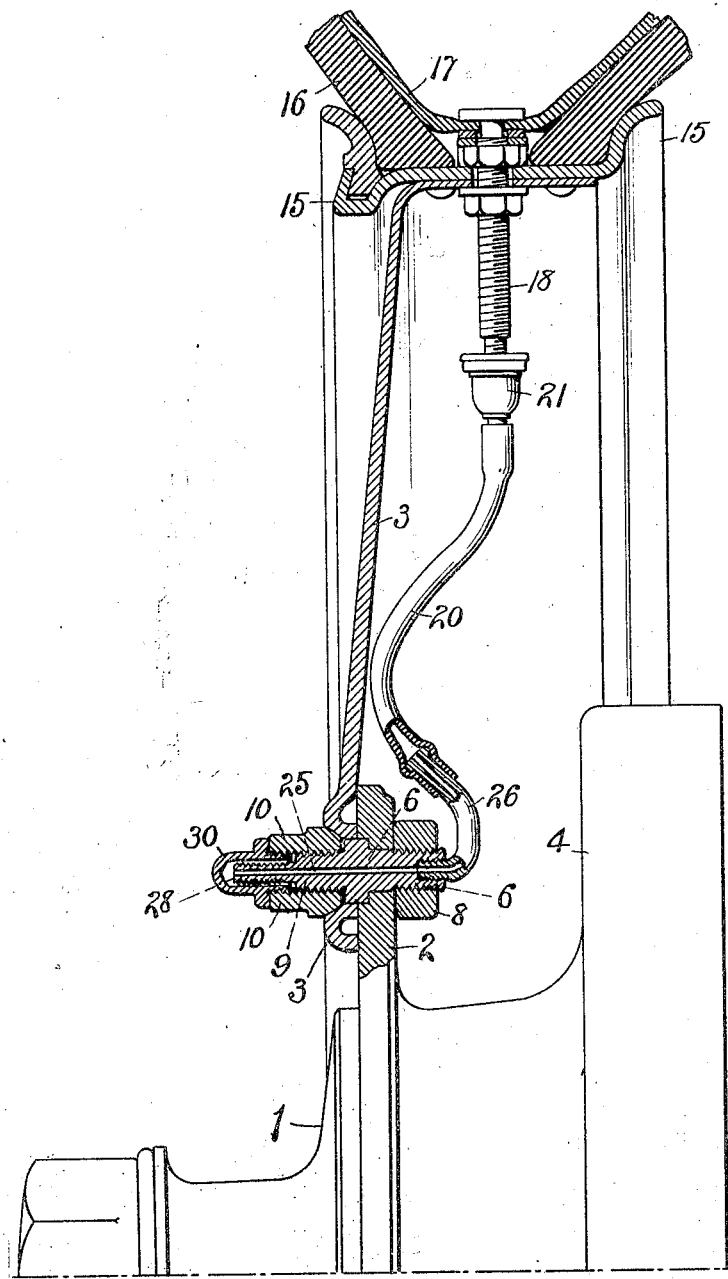
Inventor
Joseph A. Steinmetz
By F. DeWitt Goodwin
Attorney Patented Apr. 17, 1923.

1,452,284

UNITED STATES PATENT OFFICE.

JOSEPH A. STEINMETZ, OF PHILADELPHIA, PENNSYLVANIA.

TIRE-INFLATING ATTACHMENT FOR DISK WHEELS.

Application filed April 11, 1921. Serial No. 460,408.

*To all whom it may concern:*

Be it known that I, JOSEPH A. STEINMETZ, a citizen of the United States, residing at Philadelphia, in the county of Philadelphia and State of Pennsylvania, have invented certain new and useful Improvements in a Tire-Inflating Attachment for Disk Wheels, of which the following is a specification.

My invention relates to a tire inflating attachment for disk wheels for vehicles, particularly automobiles having solid disk wheels, with pneumatic tires thereon, and having the valve stem located on the inside of the disk, adjacent to the vehicle, thus making the valve stem difficult to locate and inaccessible.

The object of my invention is to provide means for obviating the necessity of reaching around the wheel to connect the tube from a pump, or source of air supply, when it is desired to inflate the tire; a further object of my invention is to provide a device comprising a tube having a part extending through the wheel, with means upon the end of the tube forming a nipple, located upon the outer vertical face of the wheel, to which an air supply pipe may be readily attached for inflating the tire to which the opposite end of the said tube is connected; these together with various novel features of construction and arrangement of the parts, which will be more fully hereinafter described and claimed, constitute my invention.

Referring to the accompanying drawing: Fig. 1 is a partial sectional view of a disk wheel, showing one-half of the wheel, with my invention embodied therein.

Referring to the accompanying drawing, in which like reference characters refer to like parts, 1 represents the hub of a disk wheel having thereon a flange 2 to which is detachably secured the solid disk 3, and on some wheels the brake drum 4 is also mounted upon the hub 1. Said disk 3 is secured upon the flange 2 in a manner well known by those skilled in the art. The securing means consisting of a number of bolts 6. Each bolt is secured upon the flange 2 by a nut 8 impinging against the back face of the flange 2, which holds the body of the bolt rigidly upon said flange. The disk 3 is provided with apertures through which the opposite end 9 of the bolt extends and the disk 3 is tightly clamped against the outer face of the flange 2 by a nut 10.

The disk 3 carries the rim 15, upon which is mounted the tire 16, having an inner tube 17, with a valve stem 18 projecting through an aperture formed in the rim 15. The valve stem 18 occupies a position upon the inside of the wheel between the solid disk 3 and the vehicle, making it difficult to attach an air supply pipe to the valve stem. In wheels having spokes the valve stem is located in the open space between the spokes making it accessible from the outer face of the wheel, whereas in a solid disk wheel great inconvenience is experienced in attaching the supply pipe to the valve stem.

The present invention provides an extension tube upon the valve stem which extends through an aperture formed through the wheel and thus forms a connecting means conveniently located upon the outer face of the wheel for attaching the air supply pipe thereto.

The extension tube 20, Fig. 1, may be provided at one end with any suitable form of detachable fitting for attaching the tube to the valve stem, such as the fitting 21, adapted to slip over the end of the valve stem 18, or adapted to screw upon the end of the valve stem 18. The opposite end of the said tube may be provided with a nipple similar to the screw threaded end of the valve stem 18 to which an air supply pipe may be readily attached for filling the tire.

In the form shown the tube 20 is connected with the bolt 6, which extends through the wheel, and said bolt is provided with an aperture 25, extending longitudinally through the same. A curved metal pipe 26 may be screwed into the end of the bolt 6, forming a suitable connecting means between the bolt and the tube 20, when it is desired to form the last mentioned tube of rubber. The opposite end of the bolt 6 terminates with a reduced threaded nipple 28, forming means for attaching an air supply pipe.

A novel form of cap 30 is provided for protecting nipple 28 of the bolt. The cap 30 is detachably secured upon the nut 10 and fits loosely over the end 28 of the bolt, thus permitting the nut 10 to be removed from the bolt 6 without first removing the cap 30, when removing the disk portion 3 of the wheel from the flange 2 of the hub. Said cap 30 is provided with a threaded shank which is adapted to be screwed into threaded aperture formed in the nut 10 to receive the bolt and said shank may be made the same size as the threaded aperture for receiving the bolt, thus reducing the cost of manufacture. Said cap 30 may be readily removed from the nut when it is desired to attach an air supply pipe to the nipple 28, formed on the bolt, for injecting air into the tire.

The tubes 20 and 26 and the bolt 6, together, form an extension tube with an air passageway formed there through and said extension tube projects through the wheel and terminates adjacent to the outside vertical face of the wheel, in such a position that an air supply pipe may be readily attached thereto for inflating the tire.

The fitting 21 of the tube 20, may be readily detached from the valve stem and the tube allowed to remain upon the hub flange 2 when the disk 3 is removed from the hub.

Having thus described my invention, I claim and desire to secure by Letters Patent:

A pneumatic tired wheel for vehicles comprising a hub, a disk detachably mounted upon said hub, bolts upon the hub extending through the disk, nuts upon the bolts for securing the disk upon the outer face of the hub, one of said bolts having an air passageway formed therethrough, said last mentioned bolt having a nipple formed upon the outer end thereof for the attachment of an air supply pipe, a cap adapted to fit loosely over the end of said nipple, said cap being detachably secured upon the nut and removable with said nut from the bolt carrying the same, and means forming a confined air passageway between the inner end of the bolt and the pneumatic tire.

In testimony whereof I affix my signature.

JOSEPH A. STEINMETZ.